(12) United States Patent
Wigsten et al.

(10) Patent No.: US 7,537,533 B2
(45) Date of Patent: May 26, 2009

(54) CHAIN TENSIONING DEVICE LINKING TWO STRANDS OF A CHAIN DRIVE

(75) Inventors: Mark M. Wigsten, Lansing, NY (US); George L. Markley, Montour Falls, NY (US)

(73) Assignee: BorgWarner Inc., Auburn Hills, MI (US)

( * ) Notice: Subject to any disclaimer, the term of this patent is extended or adjusted under 35 U.S.C. 154(b) by 420 days.

(21) Appl. No.: 11/382,730

(22) Filed: May 11, 2006

(65) Prior Publication Data

US 2006/0247080 A1   Nov. 2, 2006

Related U.S. Application Data

(63) Continuation-in-part of application No. 10/685,849, filed on Oct. 15, 2003, now Pat. No. 7,097,579.

(60) Provisional application No. 60/746,665, filed on May 8, 2006.

(51) Int. Cl.
*F16H 7/08* (2006.01)
(52) U.S. Cl. .................. 474/111; 474/101; 474/109
(58) Field of Classification Search .................. 474/101, 474/109, 111, 140, 134; *F16H 7/08, 7/18, F16H 7/22*
See application file for complete search history.

(56) References Cited

U.S. PATENT DOCUMENTS

| 4,069,719 | A | 1/1978 | Cancilla |
| 4,553,509 | A | 11/1985 | Mezger et al. |
| 4,869,708 | A * | 9/1989 | Hoffmann et al. ........... 474/140 |
| 5,221,236 | A | 6/1993 | Raymer et al. |
| 5,797,818 | A * | 8/1998 | Young ......................... 474/111 |
| 5,967,922 | A | 10/1999 | Ullein et al. |
| 5,989,138 | A | 11/1999 | Capucci |
| 6,129,644 | A | 10/2000 | Inoue |
| 6,155,941 | A * | 12/2000 | White et al. ................. 474/110 |
| 6,322,470 | B1 | 11/2001 | Markley et al. |
| 6,358,169 | B1 * | 3/2002 | Markley ...................... 474/111 |
| 2002/0045503 | A1 * | 4/2002 | Young et al. ................. 474/111 |
| 2004/0067806 | A1 * | 4/2004 | Markley et al. ............. 474/110 |
| 2005/0085322 | A1 | 4/2005 | Markley |

FOREIGN PATENT DOCUMENTS

| GB | 2022762 A | * | 12/1979 |
| JP | 2003074652 | | 3/2003 |

* cited by examiner

*Primary Examiner*—Bradley T King
*Assistant Examiner*—Anna Momper
(74) *Attorney, Agent, or Firm*—Brown & Michaels, PC

(57) ABSTRACT

A tensioner for imparting tension to a chain in a closed loop chain drive system of an internal combustion engine is disclosed. The tensioner contains two tensioning devices, one for each strand of chain that traverses between a drive sprocket and at least one driven sprocket. The two tensioning devices are installed on a single bracket which is mounted to the engine housing at a single dampened pivot mount. The pivot mount is positioned equidistant from the mid points along the lengths of each of the chain sliding surfaces of each of the tensioning devices to substantially form an isosceles triangle.

15 Claims, 8 Drawing Sheets

CHAIN TENSIONING DEVICE LINKING TWO STRANDS OF A CHAIN DRIVE

REFERENCE TO RELATED APPLICATIONS

This is a continuation-in-part of copending parent patent application Ser. No. 10/685,849, filed Oct. 15, 2003 and published as US 2005/0085322 A1 on Apr. 21, 2005, from which this application claims priority. The aforementioned application is hereby incorporated herein by reference.

BACKGROUND OF THE INVENTION

1. Field of the Invention

The invention pertains to the field of closed loop chain drive tensioners for application with internal combustion engines. More particularly, the invention pertains to a dual tensioner that pivots about a single mounting point.

2. Description of Related Art

A tensioning device is used to control a closed loop power transmission chain as the chain travels between a plurality of sprockets that are connected to the operating shafts of an internal combustion engine. In this system, the chain transmits power from a driving shaft to a driven shaft, such as a camshaft, so that, at any point in time, part of the chain may be slack while part is tight. It is important to impart and maintain a certain degree of tension on the chain to prevent noise, slippage, or the unmeshing of teeth as in the case of a toothed chain drive system. Prevention of such slippage is particularly important in the case of a chain driven camshaft in an internal combustion engine because the jumping of teeth will throw off the camshaft timing, possibly causing damage to the engine or rendering it totally inoperative.

However, in the harsh environment of the internal combustion engine, numerous factors cause fluctuations in the tension of any given portion of the chain. For instance, extreme temperature fluctuations and differences in the coefficients of thermal expansion between the various parts of the engine can cause the chain tension to vary between excessively high and very low levels. During prolonged use, wear to the components of the power transmission system can cause a steady decrease in chain tension. In addition, camshaft and crankshaft induced torsional vibrations cause considerable variations in chain tensions. For example, the reverse rotation of an engine, occurring during stopping of the engine or in failed attempts at starting the engine, can also cause significant fluctuations in chain tension. For these reasons, a mechanism is desired to remove excessive tensioning forces on the tight side of the chain while, at the same time, ensuring that adequate tension is applied to the slack side of the chain.

Hydraulic tensioners are a common method of maintaining proper chain tension. In general, these mechanisms employ a lever arm that pushes against the chain on the slack side of the power transmission system. Hydraulic pressure urges a piston against the lever arm, which in turn, forcibly engages the chain to tighten it during slack conditions.

Blade tensioners are commonly used to control a chain or belt where load fluctuations are not so severe as to overly stress the spring or springs. A conventional blade spring tensioner includes a blade shoe having a curved chain sliding face which maintains contact with the strand of chain with which it is engaged. To increase the amount of tensioning force applied to the chain, at least one blade spring is installed between the blade shoe and the chain sliding face. A bracket houses the blade shoe and the chain sliding face. The bracket is securely mounted to the engine by bolts, rivets or other such means. There may be only one mounting means which would allow the bracket to pivot in response to changing tension loads. The pivot point may be at either end of the bracket or in the middle, as desired. Alternatively, the bracket may be securely mounted to the engine by two or more mounting means which effectively prevents any pivoting movement of the tensioner. In any case, the mounting means are located adjacent the strand of chain with which the tensioner is engaged. Often, the mounting means are located outside of chain loop itself.

FIG. 1 shows a prior art chain driving system having a blade tensioner and a guide. A closed loop chain 8 encircles driving sprocket 12 and driven sprocket 10. Each sprocket 10 and 12 accelerates and decelerates independently while maintaining forward motion. A fixed guide 14 is attached to a bracket 7 on the tight strand of the chain. Opposite the guide 14 on the slack strand of the chain is a tensioner 16, which is at least semi-rigidly fixed to the bracket 7 and biased towards the tight strand of the chain. Bolts 18 fasten the bracket containing the tensioner 16 and the guide 14 to the engine block (not shown).

When the driving sprocket 12 accelerates or the driven sprocket 10 decelerates, an energy wave or high local load is created in the tight strand of the chain, which travels from the sprocket that has changed in velocity toward the other sprocket. The chain 8 attempts to span the distance between the link of the chain in contact with the initiating sprocket to the other sprocket in the shortest possible distance, a straight line. The energy moves through the links on the free strand of the chain until it comes to the end of the guide 14, which absorbs the energy. As a result of the constant absorption of the high local load the ends of the guide 14 sustain significant wear. The energy wave can also be present and provide the same results if it were to have originated in the slack strand. However, the effects of these energy waves may not occur at all depending on how well the tensioner keeps the slack out of the chain.

U.S. Pat. No. 5,967,922 discloses a tensioning device containing a tension lever that has first and second slide blocks affixed such that the slide blocks are on either side of the slack side of the chain. The first slide block is pivotally attached to a guide rail on the tight side of the chain. The second slide block is biased against one of the sides of the slack side of the chain by a tension element comprising a compression spring and a piston.

U.S. Pat. No. 6,322,470 discloses a tensioner that includes a pair of pivoting arms used to simultaneously tension two separate strands of the same chain. A lever with fixed pins is located between the two strands. The arms are pivotally mounted to the fixed pins and extend outside the strands of the chain. They contain shoes to contact the outside portion of the chain. Rotation of the lever causes the fixed pins to move laterally and draw in the arms to simultaneously impart tension to the separate strands of chain.

Japanese Application No. 2003-074652 discloses a tensioner in which a support member is pivotally located on a center line connecting the two sprockets. Attached to the support member are pressing members on either side of the chain. The damping that is imparted to the slack and tight strands of the chain is individual to each strand because each of the pressing members floats relative to the chain. While there is only one pivot present between the two pressing members, the load on one tries to affect the other and the pressing members undulate back and forth on the chain.

Referring to FIG. 2, a chain tensioner assembly as disclosed in US Patent Publication No. 2005/0085322A1 is shown. The chain tensioner assembly consists of a tensioner 116 and a chain guide 114, both of which are secured to a bracket 136. The tensioner 116 engages one strand of chain 108 while the chain guide 114 engages the other strand of the chain. The bracket is pivotally mounted to the engine housing at a pivot means 120 which is located in a hole 128 between the two strands of the chain and along the centerline that is formed between the central axis of the driving sprocket 112 and the central axis of the driven sprocket 110. The bracket is allowed to pivot about the pivot means 120 in either a clockwise or counterclockwise direction in response to both slack and tight tension conditions experienced by either strand of the chain.

A typical closed loop chain drive power transmission system will have one strand that is tight most of the time during operation while the other strand is slack most of the time. The prior art tensioners address this condition by placing a tensioning device in contact with the strand that is predominantly slack while merely placing a guide element adjacent the tight strand. These devices are often not capable of providing a smooth transition from the predominant tension condition to the opposite tension condition in which the tight strand becomes slack and the slack strand becomes tight. It is desirable to have a tensioner that can smoothly adjust to a reversal in the predominant tension condition of the chain so that a balanced tension is experienced on a consistent basis throughout the entire chain system.

SUMMARY OF THE INVENTION

The present invention is a tensioner for a closed loop chain drive system used in an internal combustion engine. It may be utilized on a closed loop power transmission system between a driveshaft and at least one camshaft or on a balance shaft system between the driveshaft and a balance shaft. The tensioner contains a bracket located between the strands of the closed loop chain and two tensioning devices integral to the bracket, with each tensioning device having an elongated compliant chain guide element that slidably engages a portion of the length of one of the two strands of chain. The bracket is mounted to the engine housing at a single point in order to permit the bracket to pivot about the mounting point in response to fluctuations in the tension of either or both of the strands. The pivot point is equidistant from the approximate midpoint along the lengths of each of the compliant chain guide elements to substantially form an isosceles triangle. Preferably, the pivot point is located along an artificial centerline that exists between the axes of the drive sprocket and the driven sprocket.

Additional biasing force on the chain may be provided by inserting at least one blade spring between the bracket and the complaint chain guide element. As the tension of each strand of chain fluctuates during engine operation, the bracket pivots about the pivot point thus enabling one of the tensioning devices to increase tension on the strand of chain that is becoming slack while, at the same time, not over-tensioning the other strand at it becomes tighter. This results in a smoother transition between the rapidly fluctuating slack and tight modes in the tension of the chain.

DETAILED DESCRIPTION OF THE INVENTION

Figure 1:
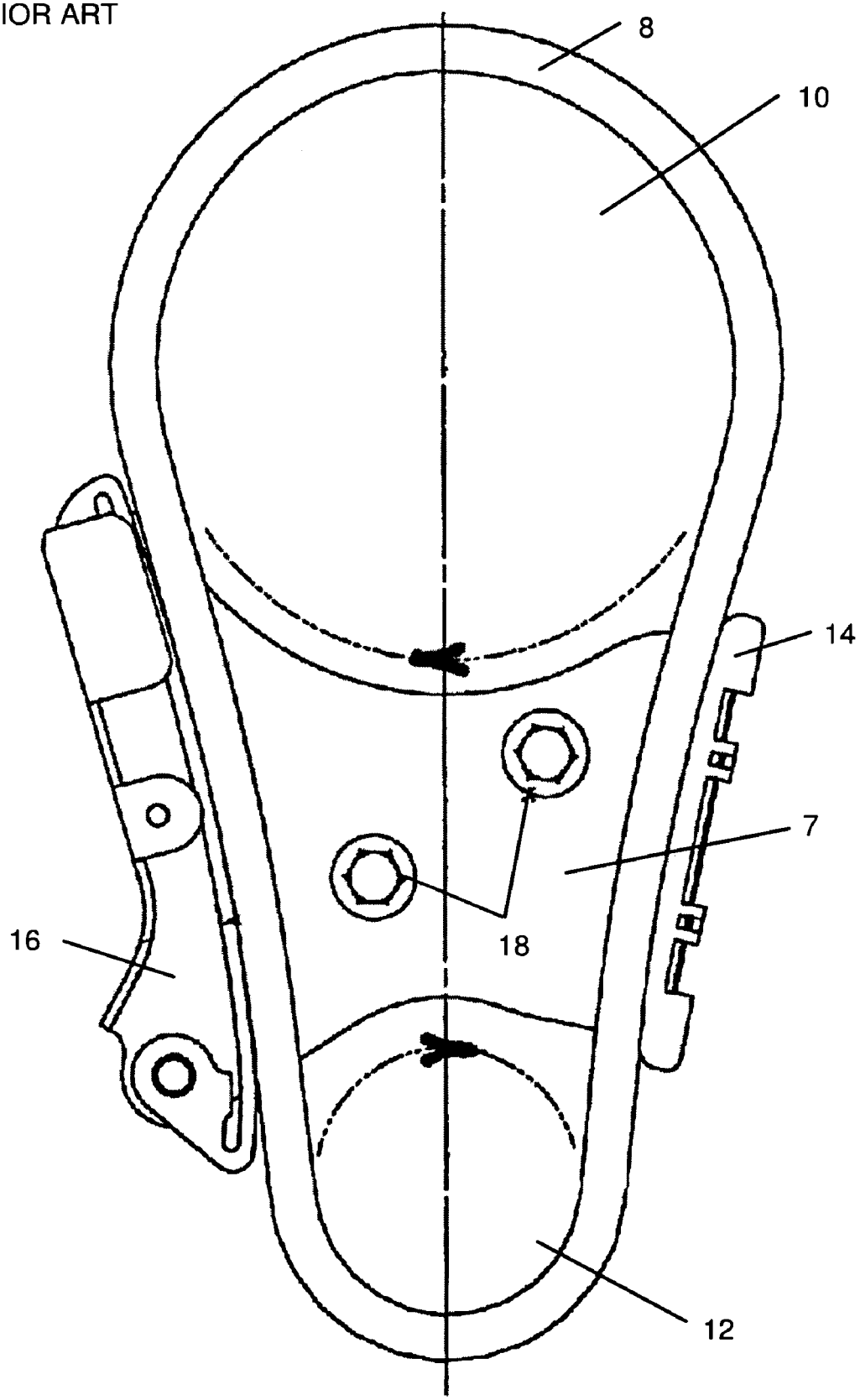
FIG. 1 shows a prior art tensioner on one strand of chain and a guide on the other strand of chain in a closed loop power transmission system.
Figure 2:
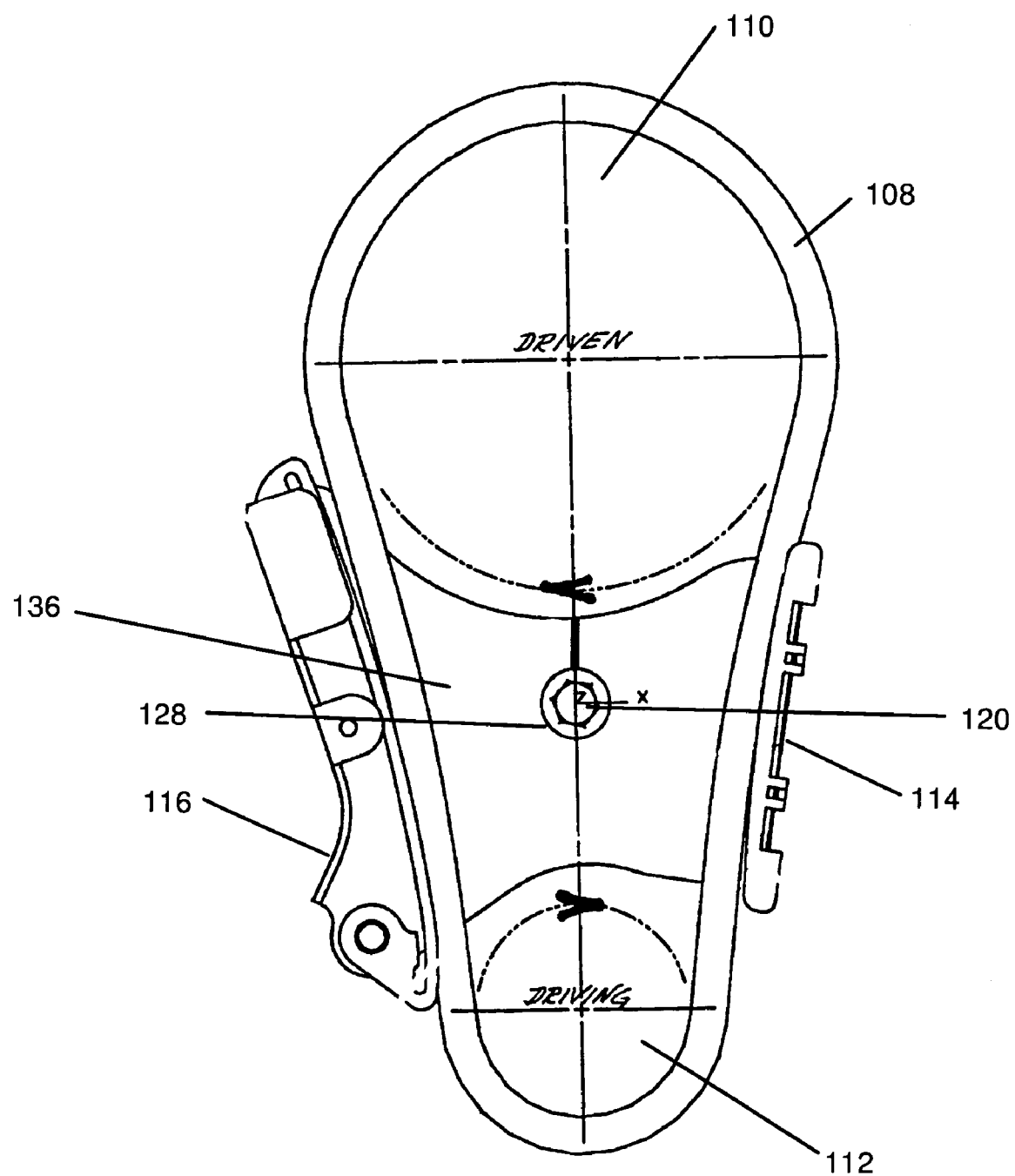
FIG. 2 shows a prior art tensioner similar to the tensioner of FIG. 1 with the exception that the bracket is allowed to pivot about a pivot point that is located on the center line created between the central axis of the drive sprocket and the central axis of the driven sprocket.
Figure 3:
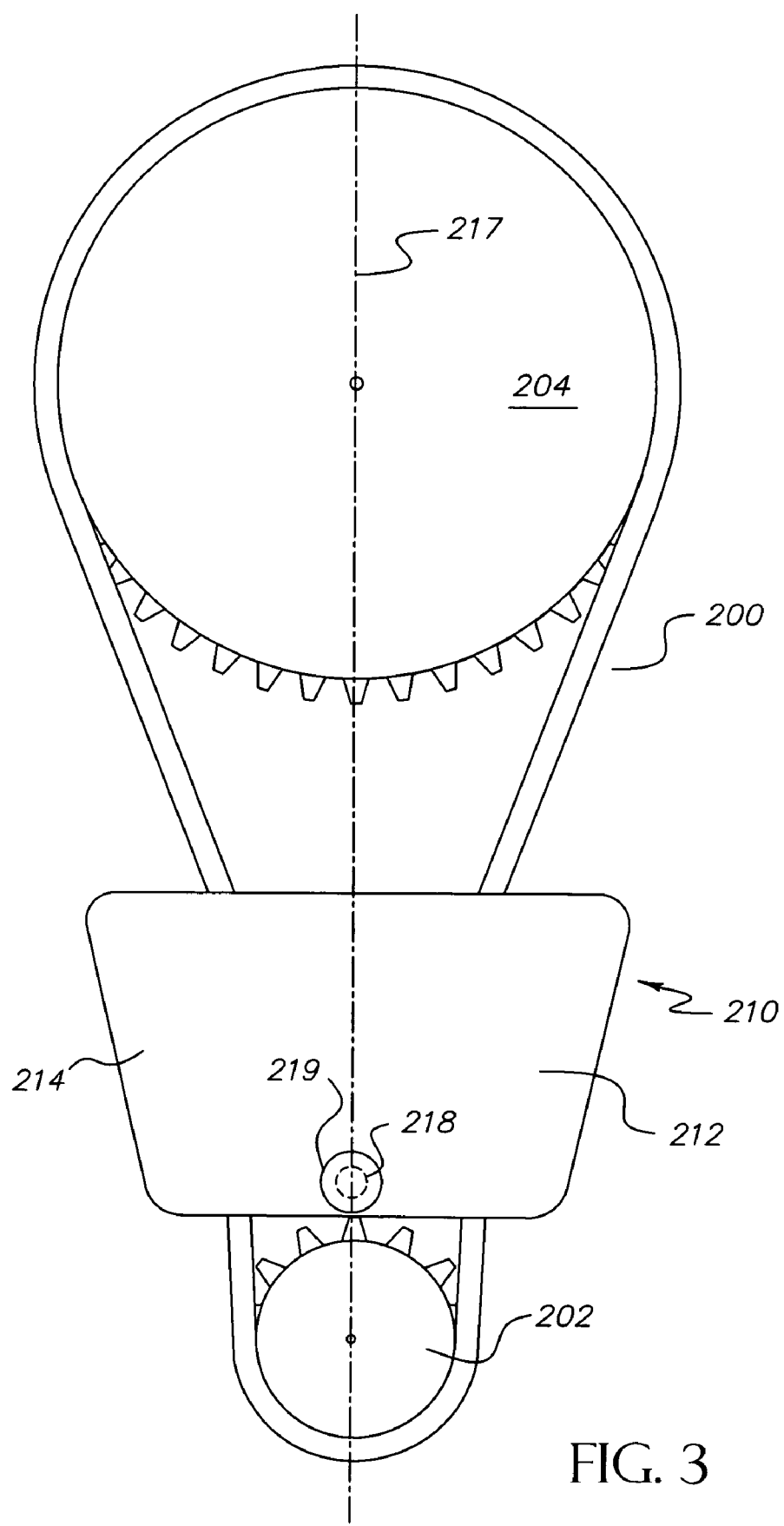
FIG. 3 shows a first embodiment of the tensioner of the present invention mounted on a closed loop power transmission system.

FIG. 3 shows a first embodiment of the tensioner of the present invention. Tensioner 210 is installed on a closed loop chain driven system of an internal combustion engine. As exemplified by the drawings associated with the first embodiment, a power transmission system is shown. The power transmission system consists of a drive shaft operatively connected to at least one camshaft by a continuous chain. However, this invention is also applicable to a closed loop balance shaft system where a drive shaft is connected to a balance shaft by a closed loop chain.

The power transmission chain drive system that is shown in FIG. 3 is embodied by a driving sprocket 202, affixed to a drive shaft (not shown), operatively connected to at least one driven sprocket 204 by a chain 200. The driven sprocket 204 is connected to one end of a camshaft (not shown). Internal combustion engines may have one (as illustrated in the appended figures), two or four camshafts, depending on engine design. A first embodiment of the tensioner 210 will be described hereinafter with respect to a single camshaft. However, it should be understood that the tensioner 210 may be used on power transmission systems having more than one camshaft.

Figure 4:
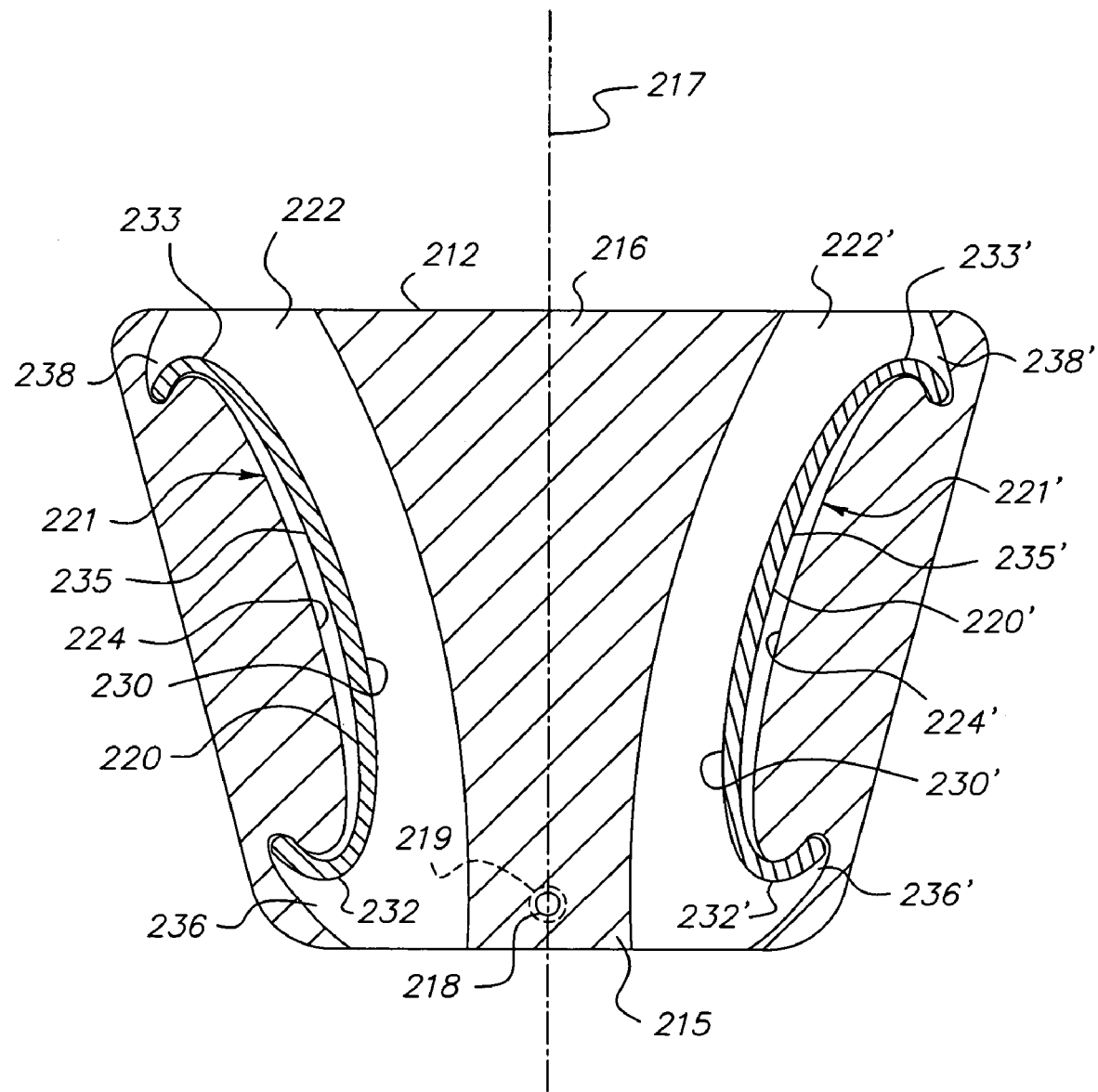
FIG. 4 shows the inner surface of the tensioner of FIG. 3.

The tensioner 210 contains a bracket 212 having an outer surface 214 and an inner surface 215 (referring now to FIG. 4). The tensioner 210 is pivotally mounted to the housing of the engine (not shown) by a mounting means, such as, for example, a bolt, a rivet or a pin, to create a pivot mount 219. Pivot mount 219 is inserted through pivot hole 218 which is positioned in proximity to the bottom of bracket 212. The pivot mount 219 includes torsional damping means which secures the bracket 212 to the engine housing with sufficient torque to absorb minimal energy inputs that may be produced by minor variations in chain tension. The torsional damping may be provided by applying a pre-determined load to the bracket at the pivot point. For example, a spring washer may be compressed between the pivot mount (fastener) and the bracket to create a desired amount of frictional force between the bracket and the engine. Any rotational motion of the bracket relative to the engine will be resisted by the frictional force between the bracket and the engine. This frictional damping force can be adjusted in many ways, such as by modifying the applied force at the pivot point, by modifying the contact geometry between the bracket and the engine (e.g. by varying the configuration of the parts or the amount of contact surface area), or by selecting a bracket material that would result in a desired coefficient of friction between the bracket and the engine.

Figure 5:
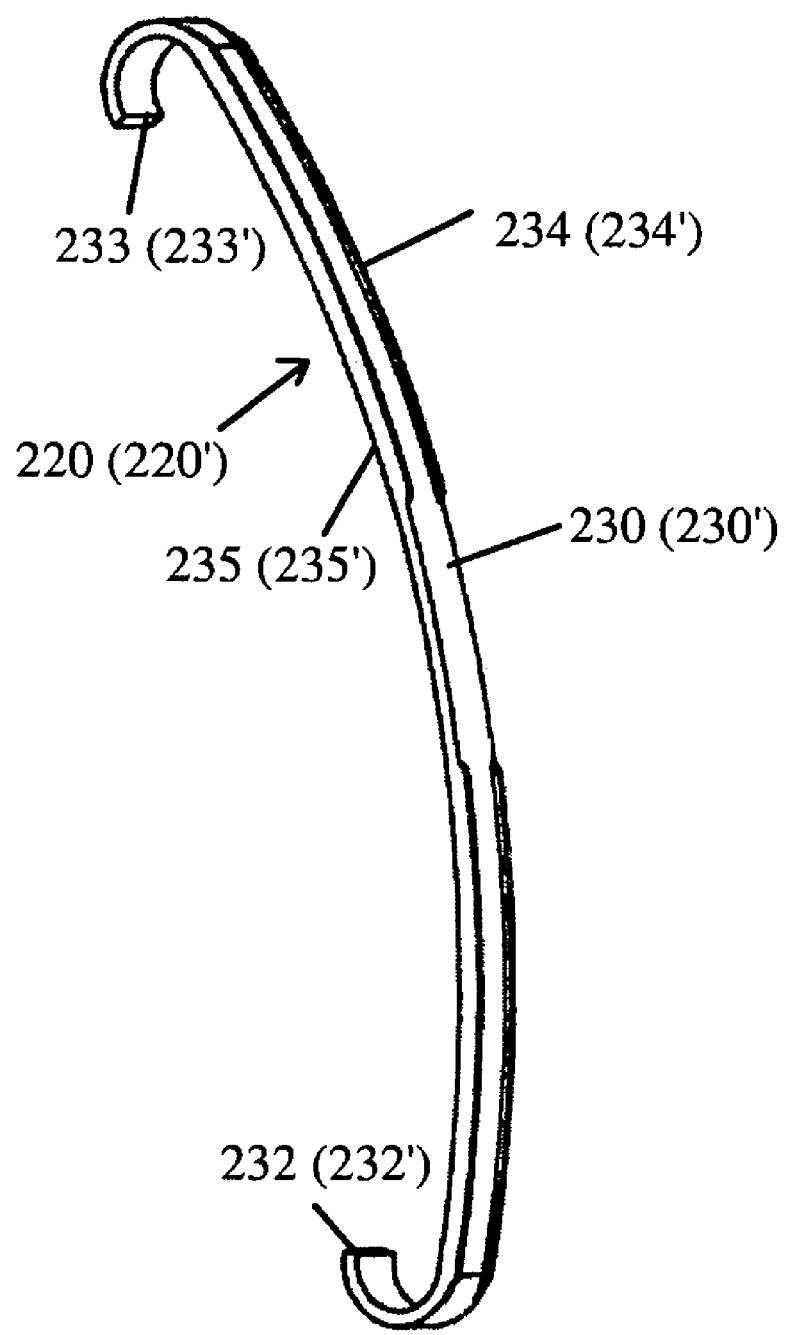
FIG. 5 shows an isometric view of the compliant chain guide element of the tensioning devices.

Referring to FIG. 4, the inner surface 215 of bracket 212 is shown. The inner surface 215 houses the tensioning devices 221 and 221', each of which are in operative engagement with one of the two strands of chain 200 (not shown). The tensioning devices 221 and 221' include compliant chain guide elements 220 and 220', respectively. Referring to FIG. 5, the compliant chain guide element 220 (220') consists of an elongated chain sliding surface 230 (230'), which maintains continuous sliding contact substantially along its entire length with a single strand of chain 200.

Pivot hole 218 is located substantially equidistant from approximate mid points along the lengths of the elongated chain sliding surfaces 230 and 230' of each of the respective compliant chain guide elements 220 and 220' to substantially form an isosceles triangle. In a preferred embodiment, the pivot hole 218 is located along an artificial vertical centerline 217 (please note FIG. 3 and FIG. 4) that connects the axes of the drive sprocket 202 with the driven sprocket 204. Where there is more than one driven sprocket, a point equidistant between the axes of each of the driven sprockets perpendicularly intersects the artificial vertical centerline 217.

With reference to FIG. 5, opposite from the chain sliding surface 230 (230') of the compliant chain guide element 220 (220') is the inner surface 235 (235'). Perpendicular to the chain sliding face 230 (230') and positioned longitudinally along both edges of the compliant chain guide element 220 (220') are guide rails 234 (234'), which keep the chain positioned on the chain sliding face 230 (230'). The compliant chain guide element 220 (220') has a proximal end 232 (232') and a distal end 233 (233'). Both the proximal end 232 (232') and the distal end 233 (233') curve back toward the middle portion of the compliant chain guide element forming substantially hook shaped ends.

Referring again to FIG. 4, each compliant chain guide element 220 and 220' is installed into a channel, 222 and 222', respectively, which is formed between a structural rib 216 and channel walls 224 and 224', respectively, on the inner surface 215 of bracket 212. Structural rib 216 may either comprise a narrow longitudinal configuration or contain a much broader surface area on the inner surface 215, as shown in FIG. 4. The design of rib 216 is determined by the mechanical stresses that may be exerted on the tensioner 210 by different chain drive configurations. Each channel 222 and 222' acts as a guide for a single strand of chain 200.

The proximal end 232 of compliant chain guide element 220 is non-permanently engaged around a protrusion in a proximal channel recess 236 and distal end 233 is also non-permanently engaged around a protrusion in distal channel recess 238. The inner surface 235 of compliant chain guide element 220 faces channel wall 224. The compliant chain guide element 220 is made of a semi-flexible compliant material that permits it to act like an elongated spring. It may be a treated metal alloy, a nylon composite, an acrylic based material or a resin filled plastic material. In its free state, the compliant chain guide element 220 is manufactured and treated so that the distal end 233 and the proximal end 232 want to curl toward each other. When installed in channel 222, the compliant chain guide element 220 is under tension so that the proximal end 232 and the distal end 233 non-permanently abut the protrusions within their respective channel recesses, 236 and 238. Since the compliant chain guide element 220 is under tension, it bows away from the channel wall 224. When the tensioner 210 is installed on the closed loop power transmission system, the compliant chain guide element 220 is biased toward the strand of chain 200 within channel 222. In this way, the chain sliding surface 230 maintains continuous contact with chain 200 substantially along the entire length of the chain sliding surface 230. As chain tension fluctuates between slack and tight conditions, the compliant chain guide element 220 will flex toward the channel wall 224 with a resistive biasing force in response to the movement of the chain 200 in an effort to stabilize these fluctuations.

As shown with specific reference to tensioning device 221, a similar structure exists for tensioning device 221'. The proximal end 232' of compliant chain guide element 220' is non-permanently engaged around a protrusion in a proximal channel recess 236' and distal end 233' is also non-permanently engaged around a protrusion in distal channel recess 238'. The inner surface 235' of compliant chain guide element 220' faces channel wall 224'. The compliant chain guide element 220' is also made of a semi-flexible compliant material that permits it to act like an elongated spring. As with compliant chain guide element 220, it may be a treated metal alloy, a nylon composite, an acrylic based material or a resin filled plastic material. In its free state, the compliant chain guide element 220' is manufactured and treated so that the distal end 233' and the proximal end 232' want to curl toward each other. When installed in channel 222', the compliant chain guide element 220' is under tension so that the proximal end 232' and the distal end 233' non-permanently abut the protrusions within their respective channel recesses, 236' and 238'. As described hereinabove, the compliant chain guide element 220' is under tension, so it bows away from the channel wall 224'. When the tensioner 210 is installed on the closed loop power transmission system, the compliant chain guide element 220' is biased toward its respective strand of chain 200 within channel 222'. In this way, the chain sliding surface 230' maintains continuous contact with chain 200 substantially along the entire length of the chain sliding surface 230'. As chain tension fluctuates between slack and tight conditions, the compliant chain guide element 220' flexes toward the channel wall 224' with a resistive biasing force in response to the movement of its respective strand of chain 200 in an effort to stabilize these fluctuations.

Figure 6:
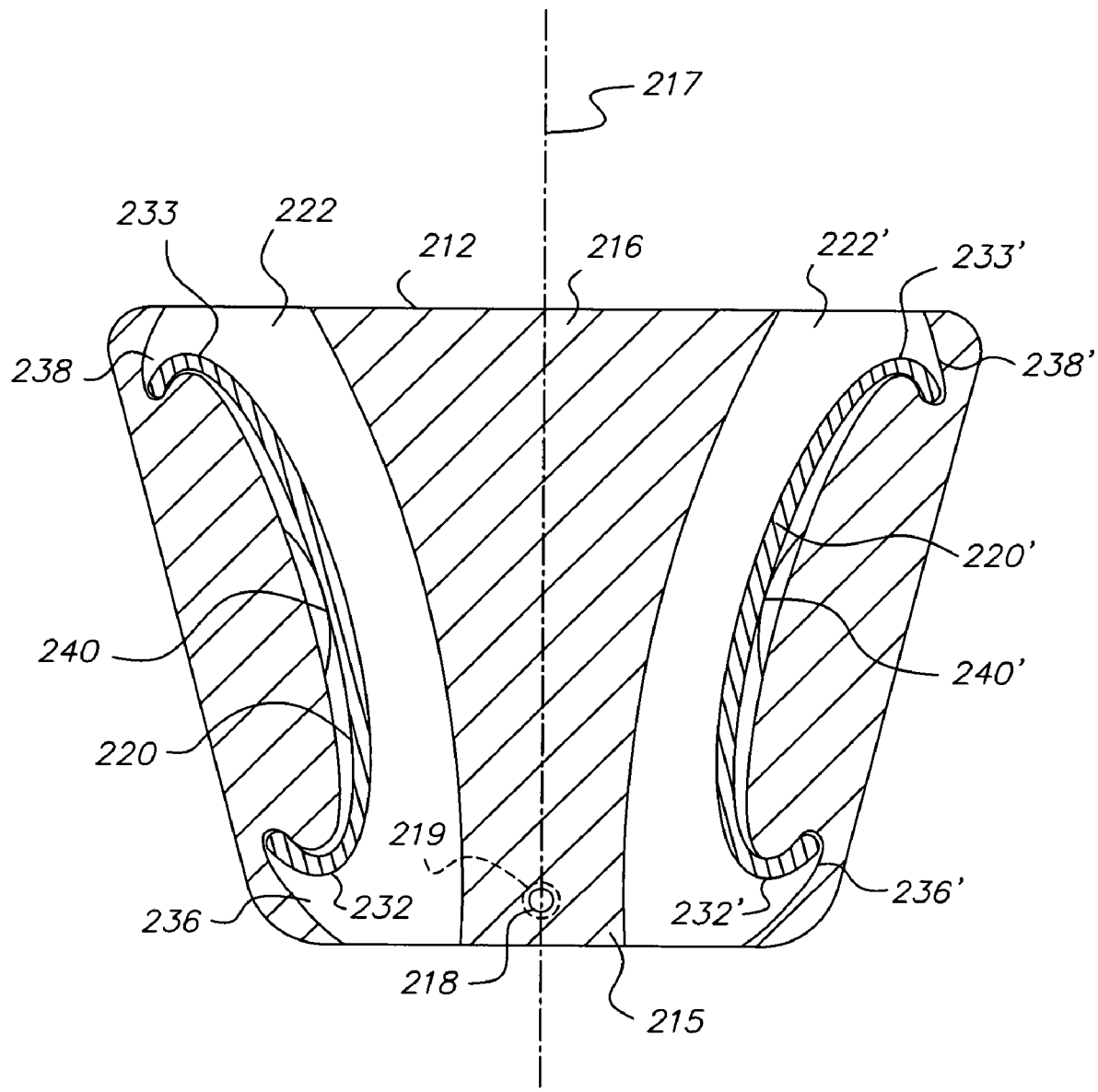
FIG. 6 shows the tensioner of FIG. 4 with blade springs added.

Referring to FIG. 6, if more force is required to maintain contact with the chain 200 (not shown), at least one blade spring 240 and 240' may be added to the respective tensioning device 221 and 221'. The blade springs 240 and 240' consist of elongated rectangular spring like materials, such as spring steel, and are manufactured and treated so that, in their free states, their ends want to curl toward each other. The blade springs 240 and 240' are installed under tension between the respective channel walls 224 and 224' and their corresponding inner surfaces 235 and 235' so that they can provide a force to augment the biasing forces of the compliant chain guide elements 220 and 220' in the direction of their respective strand of chain. Alternatively, there may be more than one blade spring installed between the channel wall 224 and compliant chain guide element 220 or between channel wall 224' and chain guide element 220'. The additional blade springs can be installed "in series" along the lengths of each of the compliant chain guide elements 220 and 220' or they may be stacked one on another at a single point of contact with the inner surfaces 235 and 235' of the respective chain guide elements 220 and 220'. As necessitated by different design features of specific engines or power transmission systems, it may be desirable to impart different tensioning to the different strands of chain 200. Alternative embodiments may include variations on the use and number of blade springs. For example, tensioning device 221 may utilize one or more blade spring 240, while tensioning device 221' may not employ any blade springs. Or, tensioning device 221' may use at least one blade spring while tensioning device 221 may not use any. Another variation involves having blade springs that are installed on one of the tensioning devices manufactured to provide a higher biasing force than the blade springs installed on the other tensioning device.

Figure 7:
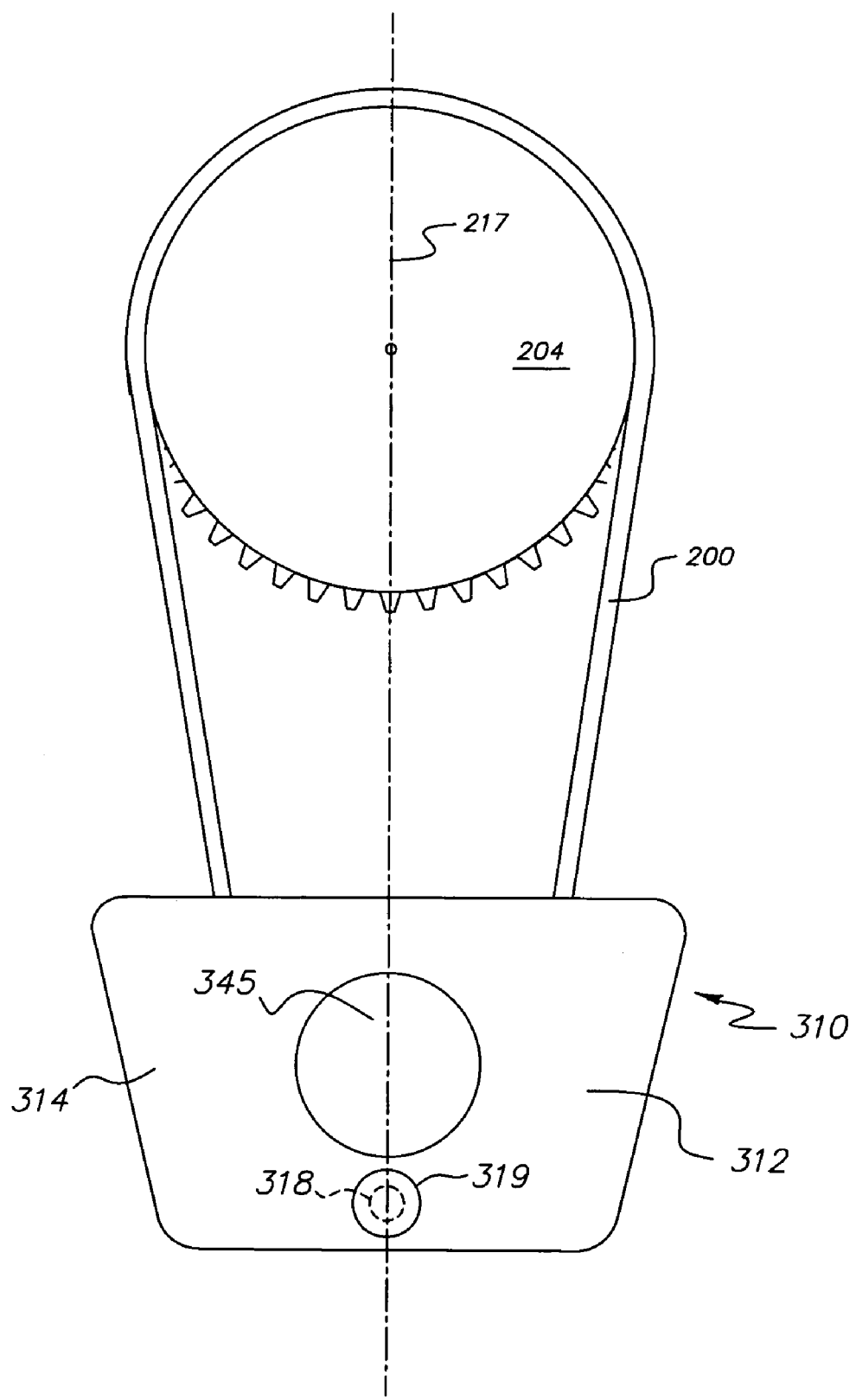
FIG. 7 shows a second embodiment of the tensioner of the present invention.
Figure 8:
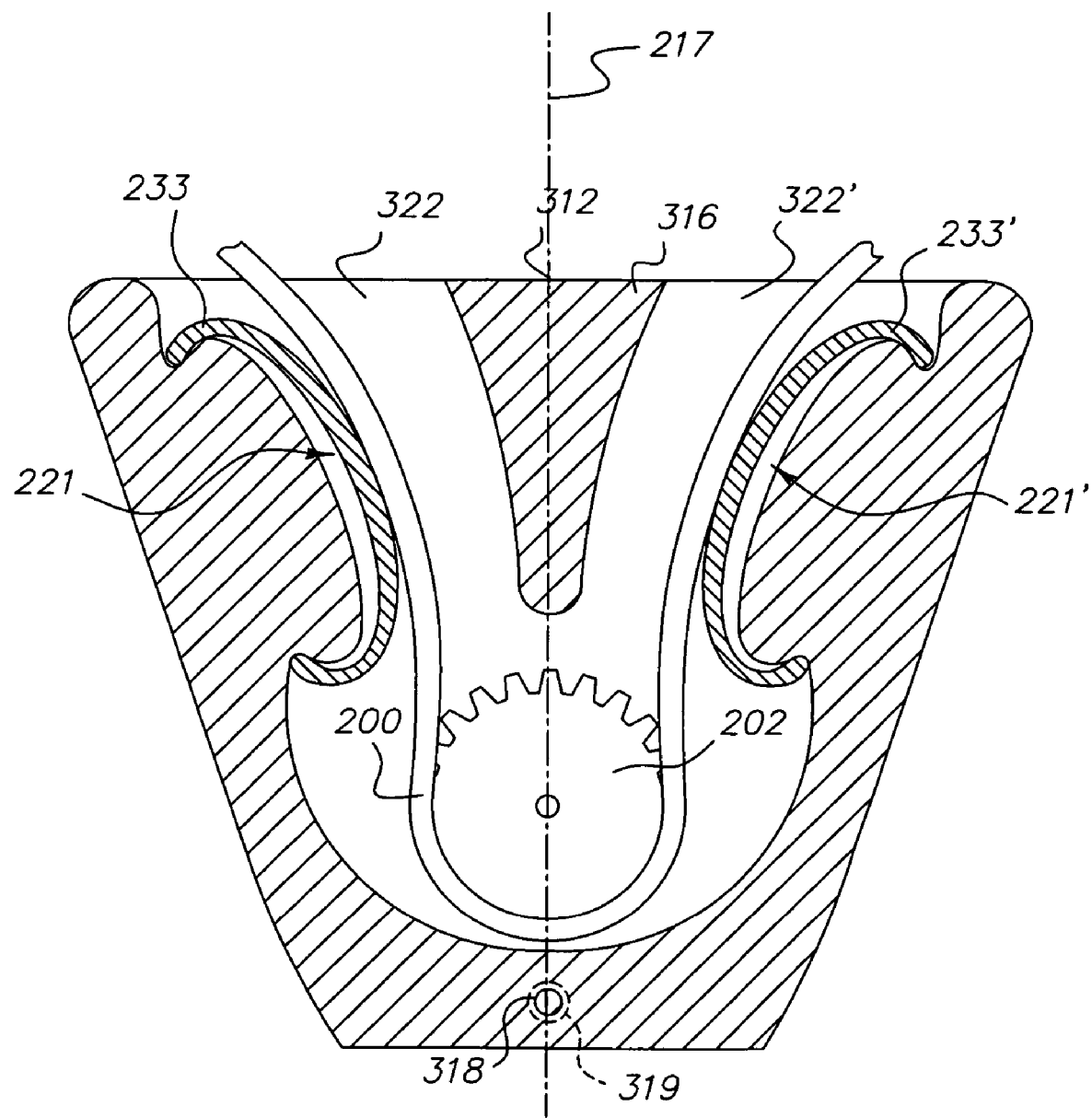
FIG. 8 shows the inner surface of the tensioner of FIG. 7.

Referring to FIGS. 7 and 8, a second embodiment of the invention is shown. The continuous loop chain drive that is shown herein is a balance shaft system, such as may be required on some internal combustion engine designs. It should be understood, however, that this embodiment may also be used in power transmission drive systems, such as timing systems where the drive shaft is connected to at least one camshaft. Referring specifically to FIG. 7, the tensioner 310 contains a bracket 312. The outer surface 314 covers the sprocket (not shown) of one of the shafts, such as the balance shaft, of this system. A raised portion 345 on the outer surface 314 provides space under the bracket 312 for housing the sprocket. Referring to FIG. 8, the pivot mount 319, such as a bolt, pin or rivet, of this embodiment is located in pivot hole 318 on the side of the sprocket opposite from the tensioners 221 and 221'. A structural rib 316 separates channel 322 from channel 322'. One strand of chain 200 travels through each channel 322 and 322'. As with the first embodiment, the important design characteristic is that pivot hole 318 is located substantially equidistant from the approximate mid points along the lengths of each of the tensioning devices 221 and 221' so as to substantially form an isosceles triangle. Preferably, the pivot mount 319 is located along the artificial vertical centerline 217 between the axes of the two sprockets. The pivot mount 319 also provides damping, as described hereinabove with respect the first embodiment.

Whether in a power transmission timing system or a balance shaft system, each of the sprockets accelerates and decelerates independent of the other while maintaining forward motion. When the driving sprocket accelerates or the driven sprocket decelerates, an energy wave is created in the spanning strand emanating from the sprocket with a decrease in velocity moving towards the other sprocket. The chain attempts to span the distance between the links of the chain meshed with the initiating sprocket of the energy wave to the other sprocket in the shortest distance possible, a straight line. The energy moves through the free strand of the chain one link at a time until it meets the end of the chain sliding surface of the tensioner that is being impacted by the energy wave and is forced to absorb that energy by pivoting away from the strand while the other tensioner pivots into the other strand to take up the slack created by the energy wave, thus balancing the load over the length of the chain.

The tensioner bracket 212 or 312, depending on the specific embodiment, pivots about its respective pivot hole in response to chain wave energy. For example, if the tensioning device 221' is experiencing a higher force from increased tightening of the adjacent strand of chain, it tends to be forced away from the chain. The pivoting motion of the bracket allows the other tensioning device 221 to forcefully bias in the direction of the slackened strand of chain to balance the overall tension loads on the closed loop chain system.

In the event of a load reversal due to torsionals or the reverse rotation that can occur during the stopping of an internal combustion engine, the slack and tight strands are reversed and the tensioner 210 or 310 would respond by tensioning the slack strand thereby preventing the bunching of the chain at the driven sprocket and the potential for tooth jumping until normal chain rotation is resumed. The triangular configuration of the two tensioning devices 221 and 221' and the pivot mount 219 or 319 of the respective tensioner bracket 212 or 312, provides substantially uniform tensioning of the chain 200 during times of extreme fluctuations in chain tension.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A tensioner for imparting tension to a chain in a closed loop chain drive system for an internal combustion engine having a drive sprocket operatively connected to a drive shaft and at least one driven sprocket operatively connected to at least one driven shaft comprising:
   a) a bracket having an outer surface and an inner surface,
   b) a first tensioning device located in a first channel on the inner surface of the bracket, the first channel located between a structural rib and a first channel wall on the inner surface, a first resilient chain guide element having a longitudinal chain sliding surface, an inner surface of the first resilient chain guide element opposite the chain sliding surface facing the first channel wall, a hook shaped proximal end of the first resilient chain guide element and a hook shaped distal end of the first resilient chain guide element, the hook shaped proximal end non-permanently engaged around a protrusion within a proximal recess in the first channel and the hook shaped distal end non-permanently engaged around a protrusion within a distal recess in the first channel,
   c) a second tensioning device positioned in a second channel, the second channel located between the structural rib and a second channel wall on the inner surface of the bracket, a second resilient chain guide element having a longitudinal chain sliding surface, an inner surface of the second resilient chain guide element opposite the chain sliding surface facing the second channel wall, a hook shaped proximal end of the second resilient chain guide element and a hook shaped distal end of the second resilient chain guide element, the hook shaped proximal end non-permanently engaged around a protrusion within a proximal recess in the second channel and the hook shaped distal end non-permanently engaged around a protrusion within a distal recess in the second channel, and
   d) a single pivot mount for securing the bracket to an engine housing, the pivot mount being positioned equidistant from an approximate mid-point along the longitudinal chain sliding surface of the first resilient chain guide element and an approximate mid-point along the longitudinal chain sliding surface of the second resilient chain guide element: wherein the pivot mount is located on an imaginary vertical centerline formed between the axis of the drive sprocket and the axis of the driven sprocket.

2. The tensioner of claim 1 wherein the pivot mount and each mid-point of each chain sliding surface of each chain guide element substantially form an isosceles triangle.

3. The tensioner of claim 1 wherein the driven shaft is a cam shaft.

4. The tensioner of claim 1 wherein the driven shaft is a balance shaft.

5. The tensioner of claim 1 wherein the chain sliding surface of the first resilient chain guide element forcibly engages a first strand of the chain along its longitudinal surface and the chain sliding surface of the second chain guide element forcibly engages a second strand of the chain along its longitudinal surface.

6. The tensioner of claim 1 further comprising at least one blade spring disposed between the first channel wall and the inner surface of the first resilient chain guide element.

7. The tensioner of claim 1 further comprising at least one blade spring disposed between the second channel wall and the inner surface of the second resilient chain guide element.

8. The tensioner of claim 1 further comprising at least one blade spring disposed between the first channel wall and the inner surface of the first resilient chain guide element and at least one blade spring disposed between the second channel wall and the inner surface of the second resilient chain guide element.

9. The tensioner of claim 1 wherein the pivot mount includes torsional damping.

10. The tensioner of claim 1 wherein the pivot mount is located between the drive sprocket and the driven sprocket within the perimeter of the closed loop chain drive system.

11. The tensioner of claim 1 wherein the pivot mount is located outside the perimeter of the closed loop chain drive system.

12. The tensioner of claim 2 wherein the pivot mount is located between the drive sprocket and the at least one driven sprocket within the perimeter of the closed loop chain drive system.

13. The tensioner of claim 2 wherein the pivot mount is located below the drive sprocket and outside the perimeter of the closed loop chain drive system.

14. The tensioner of claim 11 wherein the pivot mount is located below the drive sprocket.

15. The tensioner of claim 11 wherein the pivot mount is located below the driven sprocket.

* * * * *